United States Patent
Ota

[15] 3,668,106
[45] June 6, 1972

[54] ELECTROPHORETIC DISPLAY DEVICE

[72] Inventor: Isao Ota, Osaka, Japan

[73] Assignee: Matsushita Electric Industrial Co., Ltd., Osaka, Japan

[22] Filed: Apr. 9, 1970

[21] Appl. No.: 26,874

[52] U.S. Cl. ..........................204/299, 204/180 R, 204/181
[51] Int. Cl. .............................B01k 5/02, C23b 13/00
[58] Field of Search..................204/180, 181, 299; 96/1 A

[56] References Cited

UNITED STATES PATENTS

| | | | |
|---|---|---|---|
| 3,102,026 | 8/1963 | Metcalfe et al. | 96/1 X |
| 3,145,156 | 8/1964 | Oster | 204/299 X |
| 3,244,083 | 4/1966 | Gundlach | 96/1 X |
| 3,268,331 | 8/1966 | Harper | 96/1 |
| 3,271,145 | 9/1966 | Robinson | 96/1 |
| 3,384,565 | 5/1968 | Tulagin et al. | 204/181 |
| 3,477,934 | 11/1969 | Carreira et al. | 204/300 X |
| 3,510,419 | 5/1970 | Carreira et al. | 204/181 |
| 3,511,651 | 5/1970 | Rosenberg | 204/180 X |

Primary Examiner—John H. Mack
Assistant Examiner—A. C. Prescott
Attorney—Wenderoth, Lind & Ponack

[57] ABSTRACT

An electorphoretic display and/or recording device in which an electrophoretic suspension layer including a dispersion of at least one electrophoretic material in a finely divided powder form suspended in a suspending medium is interposed between a pair of electrodes. An electric field is imposed across the electrophoretic suspension layer to change the optical reflective property of the suspension layer by changing the spatial distribution of the electrophoretic material in the suspending medium electrophoretically.

25 Claims, 23 Drawing Figures

PATENTED JUN 6 1972 3,668,106

INVENTOR
ISAO OTA

BY Wenderoth, Lind & Ponack
ATTORNEYS

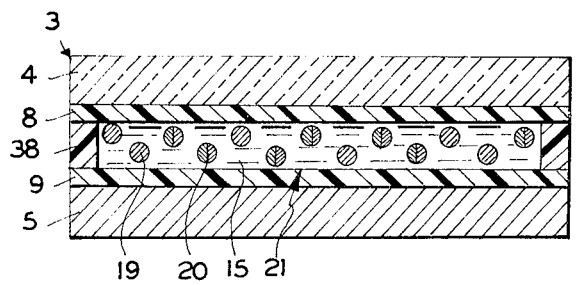
FIG.4a
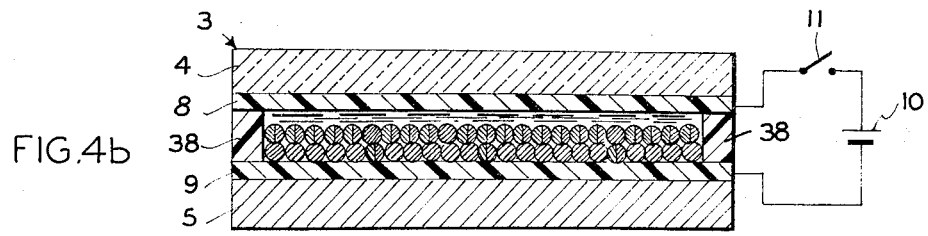
FIG.4b
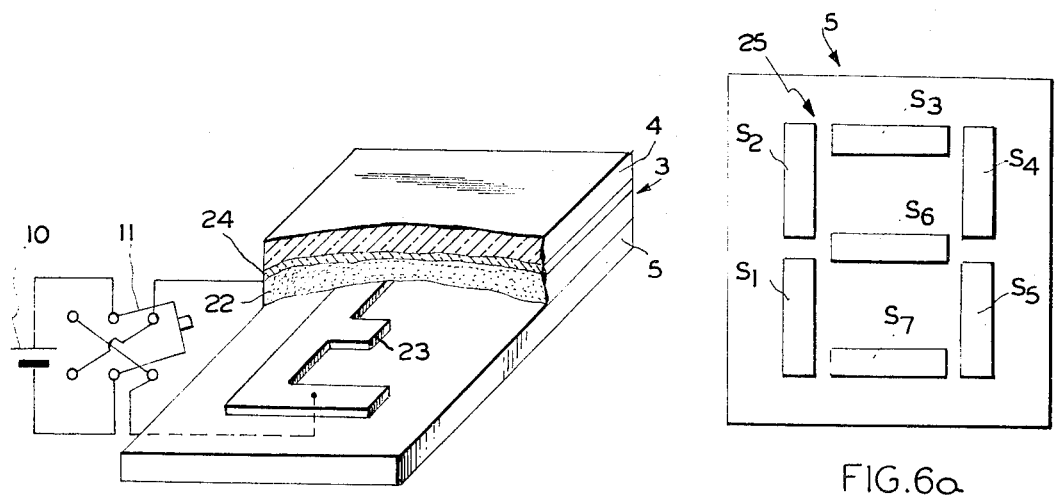
FIG.5
FIG.6a
FIG.6b
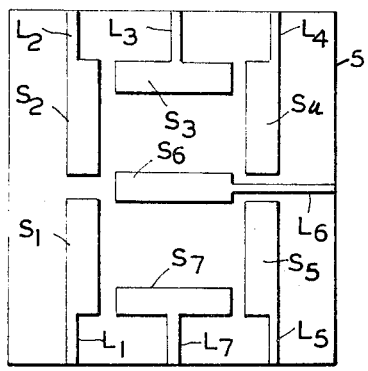
FIG.6c
INVENTOR
ISAO OTA

INVENTOR
ISAO OTA

BY Wenderoth, Lind & Ponack
ATTORNEYS

PATENTED JUN 6 1972 3,668,106

INVENTOR
ISAO OTA

BY Wenderoth, Lind & Ponack
ATTORNEYS

ELECTROPHORETIC DISPLAY DEVICE

BACKGROUND OF THE INVENTION

This invention relates to a display and/or recording device and particularly to an electrophoretic display and/or recording device comprising at least one electrophoretic material suspended in a suspending medium.

A cathode ray tube is now widely used as an electric display apparatus because of its high speed, ease with which it can be scanned, and so on, but it still has come disadvantages. For example, a cathode ray tube is difficult to produce so that it has a flat panel or so that it has a large size. In addition, it requires a high voltage to operate.

There have been proposed many electric panel display apparatuses such as an electroluminescent panel, arrays of luminescent diodes, incandescent lamps or plasma cells. They are all self-luminescent types, but are not in widespread use because of inferiority in, for example, luminescent efficiency, life or cost. Further, it is difficult for them to memorize or record the displayed image. Liquid crystals are a possible medium of which to constitute a flat panel display apparatus capable of changing color by a change in an electric field or change in heat. At present they are not actually used because their properties are not entirely satisfactory for display purposes.

The electrophoresis phenomenon is widely used in electrodeposition of fine particles or development of electrostatic latent images in electrophotography. The prior art, for example U.S. Pat. Nos. 3,145,156 to Oster, No. 2,940,847 to Kaprelian, and No. 3,384,488 to Tulagin and Carreira describe methods of producing images by utilizing electrophoresis or photoelectrophoresis.

According to these prior art methods, charged particles in the suspending medium are transported to the surface of an electrode or a sheet so as to reproduce a pattern corresponding to that of an input electric field or to an input light image. The visible image can be obtained by removing the electrode or a sheet.

The prior art is not aimed at a variation in the optical reflective property of a suspension itself with a change in the spatial distribution of electrophoretic particles in the suspension. In other words, the prior art relates essentially to the reproduction of permanent visible images but not to a changable display system.

SUMMARY OF THE INVENTION

An object of this invention is to provide a device for display and/or recording, which comprises an electrophoretic suspension layer.

A further object of this invention is to provide a large and/or flat display panel comprising an electrophoretic suspension layer.

A still further object of this invention is to provide a flexible panel for display and/or recording, which comprises an electrophoretic suspension layer.

These objects are achieved by a device for display and/or recording according to the present invention which comprises a suspension layer including a dispersion of at least one electrophoretic material in a finely divided powder form suspended in a suspending medium, said suspension layer having two opposite major surfaces; a first electrode and a second electrode which are opposed to each other and are coupled to said two opposite major surfaces of said suspension across said suspension layer through said electrodes, said electric field changing the spatial distribution of said electrophoretic material of said dispersion to change the optical reflective property of said suspension layer.

Other objects and advantages of this invention will be apparent from the following description, the accompanying drawings and the appended claims.

In the drawings:

FIGS. 4a and 4b are cross sectional views of another embodiment of this invention;

FIG. 5 is a schematic perspective view, partially broken away, of a pattern display panel according to this invention;

FIG. 6a is a front view of a first electrode for use in a character display panel according to this invention;

FIG. 6b is a cross sectional view of the panel of FIG. 6a;

FIG. 6c is a front view of another first electrode for use in a character display panel according to this invention;

The size and shapes of elements of the drawings should not be considered as actual sizes or even proportional to actual sizes because many elements have been purposely distorted in size or shape in order to more fully and clearly describe the invention.

Figure 1A:
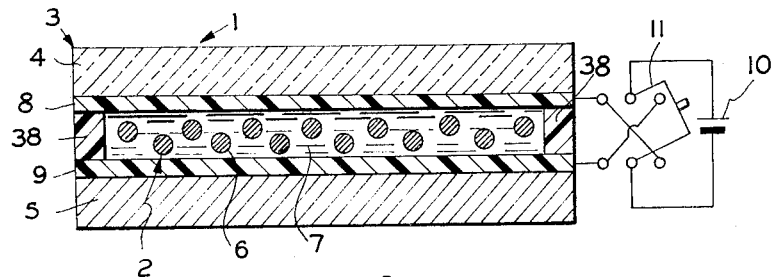
FIGS. 1a and 1b are cross-sectional views of a display and/or recording panel in accordance with this invention.

Referring to FIG. 1a, reference character 1 designates, as a whole, a display and/or recording panel which has an electrophoretic suspension layer 2 therein.

When said suspension layer 2 is in a fluid state, it is enclosed in a housing 3 having a frame 38 and two opposed major housing walls 4 and 5 which are transparent.

Said suspension layer 2 has two opposite major surfaces along said two opposite major housing walls 4 and 5 and includes a dispersion of at least one electrophoretic material 6 in a finely divided powder form suspended in a suspending medium 7. The particles of the material 6 are shown greatly enlarged in this and subsequent figures for clarity of illustration. Said two opposite major surfaces of said suspension layer 2 are in contact, respectively, with a first electrode 8 and a second electrode 9 which are transparent and are attached to the inner surfaces of said two opposite major housing walls 4 and 5.

Figure 1B:
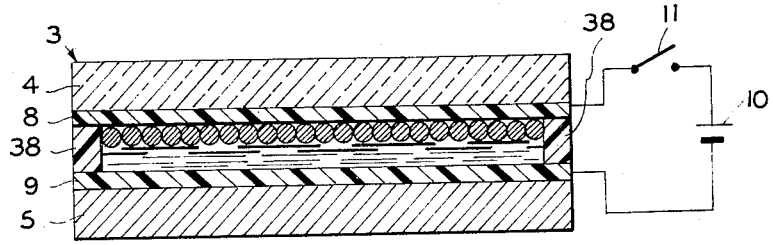

Said first electrode 8 and second electrode 9 are connected to output terminals of a D.C. voltage applying means 10 through a polarity-reversing-switching-device 11. Before an electric field is supplied to said suspension layer 2 from said D.C. voltage applying means 10, the electrophoretic material 6 in a finely divided powder form is distributed uniformly throughout the suspending medium 7 as shown in FIG. 1a. When the electrophoretic material 6 is, for example, white, and the suspending medium 7 is, for example, black, the suspension layer 2 appears gray under the illumination of incandescent lamp. When the gray suspension layer 2 is subjected to a D.C. electric field by said D.C. voltage applying means 10, the electrophoretic material 6 is caused to move electrophoretically in a direction either to a cathode or to an anode depending upon its polarity. For example, if the material 6 has a negative polarity, it moves and is deposited on the anode 8 and has a spatial distribution different from the uniform distribution as shown in FIG. 1b.

The resultant suspension layer 2 has a different spatial distribution of material 6 and a different optical reflective property from the original suspension layer 2 having the uniform distribution of the material 6. The display and/or recording panel 1 is thus white on the anode side and black on the cathode side.

The color characteristic of the display and/or recording panel 1 can be reversed by reversing the polarities of the applied voltage. When only a small amount of the electrophoretic material is deposited on the anode, which amount is insufficient to hide the resultant suspension, the panel has on the anode side, a halftone appearance dependent upon the hiding power of the electrophoretic material deposited on the anode. By "hiding power" of the suspension layer is meant the degree to which the suspension layer deposited on a base substance hides it. Therefore, the color characteristic at the anode side can be controlled continuously by controlling the amount of the electrophoretic material deposited on the electrode. The amount of the electrophoretic material deposited on the electrode can be controlled by the strength or the length of time of application of a D.C. voltage. The color characteristic at the cathode side is also changed by the electrophoretic movement of the electrophoretic material to the anode. In such a way, the display and/or recording panel 1 of the present invention can have its color characteristic changed by varying the strength, the length of time or the polarity of an applied electric field.

Electrophoretic material deposited on an electrode surface by electrophoresis will stay on the electrode even after removal of an applied electric field. This means that a display device according to the present invention employing electrophoresis of the electrophoretic material suspended in a suspending medium can memorize output information without using further electric power. The panel can have the original color characteristic restored by applying an appropriate D.C. electric field having a reverse polarity to that of the initial D.C. electric field or by applying strong mechanical vibrations to the device. Application of an A.C. electric field to the suspension layer can effectively restore the original color characteristic of the panel.

The suspending medium 7 can be prepared so as to have the desired color by dissolving a colored substance, such as a dye, in a colorless liquid or by suspending electrically neutral colored particles, such as dyes or pigments in a colorless liquid. For example, deep blue colored suspending medium can be prepared by dissolving oil black dyes in ethyle acetate or kerosene. Violet, brown or green colored suspending medium can be prepared by dissolving cobalt naphthenate, manganese naphthenate or nickel naphthenate in trichlorotrifluoroethane, respectively.

Figure 2A:
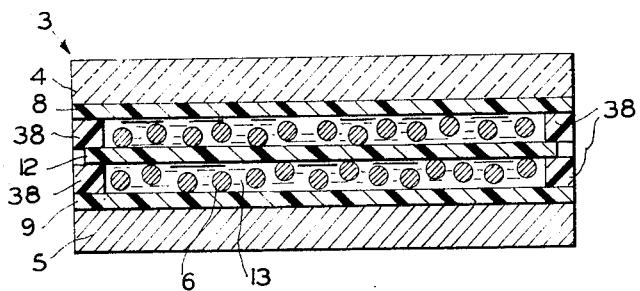
FIGS. 2a and 2b are cross-sectional views of another embodiment of this invention.

Referring to FIG. 2a wherein similar reference numbers designate components similar to those of FIG. 1, a colored porous layer 12 is inserted in a colorless suspending medium 13. In the device of FIG. 2a, a color which is a mixture of the colors of the electrophoretic material 6 and the colored porous layer 12 can be seen from both electrodes.

Figure 2B:
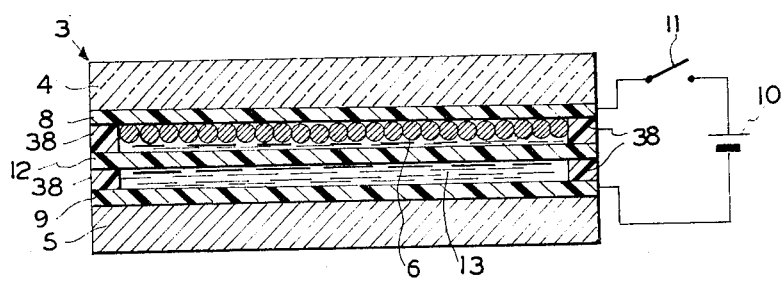

When a D.C. electric field is applied across the two electrodes 8 and 9, the electrophoretic material 6 is caused to pass through the colored porous layer 12 and to be deposited on one electrode, for example the anode, depending upon its polarity, as shown in FIG. 2b. When a layer of the electrophoretic material 6 deposited on the anode has enough hiding power, the device of FIG. 2b has the same color as the electrophoretic material 6 on the anode side. When the colored porous layer 12 can also hide a layer of the electrophoretic material 6 deposited on the anode, the device of FIG. 2b has almost the same color as the colored porous layer 12 on the cathode side.

The color characteristic can be reversed by reversing the polarity of the applied potential. It is also possible to use an electrophoretic suspension layer having a colored porous layer inserted in a colored suspending medium and at least one electrophoretic material suspended therein. Colored porous layer 12 in the present invention can be made from any sheet material having pores therein. The size of the pores must be large enough to pass the particles of electrophoretic material therethrough and small enough to hide the electrophoretic material from sight. Operable materials are a cloth or a mesh woven of natural or artificial fibers; a fibroid sheet having thousands of irregular pores; a thin plate with a lot of tiny holes; and a sheet having granular material bound together with resin or an adhesive agent to form a large number of pores.

Figure 3A:
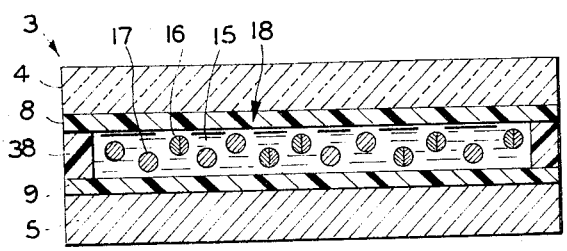
FIGS. 3a and 3b are cross sectional views of still another embodiment of this invention.

Referring to FIGS. 3a, wherein similar reference numbers designate components similar to those of the foregoing figures, a suspending medium 15 which is colored or colorless includes at least two kinds of electrophoretic materials 16 and 17 in a finely divided powder form. The suspending medium 15 and the materials 16 and 17 together make up the electrophoretic suspension layer 18. Said two kinds of electrophoretic materials 16 and 17 are different from each other with respect to the charge polarity and the optical reflective property.

The device of FIG. 3a displays at the opposite sides a color which is a mixture of the colors of said two kinds of electrophoretic materials 16 and 17, and the color of the suspending medium 15.

Figure 3B:
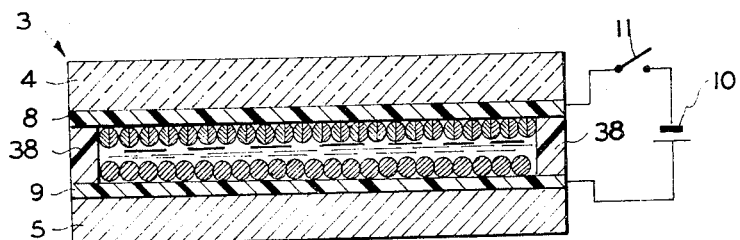

When a D.C. electric field is applied to the electrophoretic suspension layer 18, said two kinds of electrophoretic materials 16 and 17 are caused to move electrophoretically in directions opposite to each other. One material, that with a positive polarity, moves toward the cathode and is deposited on the cathode, and the other, that with a negative polarity, moves to and is deposited on the anode, as shown in FIG. 3b. When one of said electrophoretic materials 16 with positive polarity is, for example, yellow, and the other of said electrophoretic materials 17 with negative polarity is, for example, cyan, the device produces a spatial distribution of electrophoretic materials 16 and 17 as shown in FIG. 3b and it is colored yellow at the cathode side and cyan at the anode side.

Before the device is subjected to the D.C. electric field, the device has a green color, if the suspending medium 15 is colorless, at both electrodes due to a uniform spatial distribution of the yellow material 16 and the cyan material 17, as shown in FIG. 3a.

The color characteristic of the display and/or recording device can be reversed by reversing the polarity of the applied voltage.

Referring to FIG. 4a wherein similar reference numbers designate components similar to those of the foregoing figures, an electrophoretic suspension layer 21 includes a suspending medium 15 which is colored or colorless and at least two kinds of electrophoretic materials 19 and 20 in a finely divided powder form. Said two kinds of electrophoretic materials 19 and 20 have the same charge polarity but have different electrophoretic mobilities and optical reflective properties from each other. The device of FIG. 4a initially has, at both sides, a color which is a mixture of the colors of said two kinds of electrophoretic materials 19 and 20 and the color of the suspending medium 15. When said two kinds of electrophoretic materials 19 and 20 are, for example, white and black, respectively, and the suspending medium 15 is colorless, the device is colored gray at both sides. When a D.C. electric field is applied to the suspension layer 21, said two kinds of electrophoretic materials 19 and 20 are caused to move electrophoretically in the same direction.

When electrophoretic materials 19 and 20 are positively charged and the electrophoretic mobility of said electrophoretic material 19 is greater than that of said electrophoretic material 20, the electrophoretic material 19 moves faster in the suspension layer 21 under the effect of a D.C. electric field than does the electrophoretic material 20. The amount of the former deposited nearest to the cathode is larger than the amount of the latter, as shown in FIG. 4b. Therefore, the device has a deeper white color at the cathode side and a deeper black color at the anode side than does the original device to which no D.C. electric field is applied.

The color of the display and/or recording device can be reversed by reversing the polarity of the applied voltage. As is apparent from the foregoing description and figures, the color of the suspension layer according to this invention can be changed. This is because the spatial distribution of electrophoretic material in the suspension is changed by application of an electric field and a layer of at least one electrophoretic material deposited on an electrode hides or is hidden by the residual colored component in the suspension, such as the colored suspending medium, a colored porous layer or another electrophoretic material.

In the devices of the foregoing figures, it is not always necessary that both of the aforesaid two opposite major housing walls and both of the aforesaid first electrode and second electrode be transparent. It is possible to prepare a display and/or recording device which shows a change in color only at one side by employing one transparent housing wall and one transparent electrode corresponding to said one transparent housing wall.

Referring to FIG. 5, wherein similar reference numbers designate components similar to those of the foregoing figures, a suspension layer 22 can be any possible electrophoretic suspension layer, such as the suspension layer 2, 14, 18 or 21 of the FIGS. 1a, 2a, 3a or 4a. The suspension layer 22 includes at least one electrophoretic material suspended in a suspending medium and is enclosed in a housing 3 having two opposite major housing walls 4 and 5, at least one of which is transparent. In the drawing, housing wall 4 is transparent. The first electrode 23 has a pattern, such as an E-shaped pattern. The second electrode 24 is transparent and extends uniformly across the whole of the transparent housing wall 4.

When a D.C. electric field from a source 10 is applied across said first electrode 23 and said second electrode 24 through switch 11 in a manner similar to that described above, the E shaped pattern is displayed on said transparent electrode 24 due to electrophoretic movement of electrophoretic material. A change in the polarity of the applied D.C. electric field results in a change in the color of said E shaped pattern.

Referring to FIGS. 6a and 6b, wherein similar reference numbers designate components similar to those of the foregoing figures, an electrophoretic suspension layer 22 can be any possible electrophoretic suspension layer, such as one of the suspension layers 2, 14, 18 or 21 of FIG. 1a, 2a, 3a or 4a. The suspension layer 22 includes at least one electrophoretic material suspended in a suspending medium and is enclosed in a housing 3 having two opposite major housing walls 4 and 5.

A first electrode 25 is composed of a plurality of segmental electrodes $S_1 - S_7$ which are separated from each other. A second electrode 24 is transparent and extends uniformly across the whole of the transparent housing wall 4. Said plurality of segmental electrodes $S_1 - S_7$ are connected through leads to electrical terminals $T_1 - T_7$ positioned at the outer surface of said housing wall 5 as shown in FIG. 6b. Different combinations of said plurality of segmental electrodes $S_1 - S_7$ will display desired numerical characters when a D.C. electric field is applied across the selected segmental electrodes of said first electrode and the second electrode 24. For example a D.C. electric field applied across the second electrode 24 and the segmental electrodes $S_3, S_4, S_5, S_6$ and $S_7$ of the first electrode will cause the device to display the numerical character 3.

There is another method of connecting the plurality of segmental electrodes $S_1 - S_7$ to the terminals. Referring to FIG. 6c, segmental electrodes $S_1 - S_7$ of the first electrode will cause the device to display the numerical character 3.

There is another method of connecting the plurality of segmental electrodes $S_1 - S_7$ to the terminals. Referring to FIG. 6c, segmental electrodes $S_1 - S_7$ are connected to electrical terminals positioned at the side surfaces of said housing wall 5 by using leads $L_1 - L_7$ formed on the same surface as that on which said segmental electrodes are positioned. These connecting methods are illustrated as examples and should not be taken as limitative.

Figure 7:
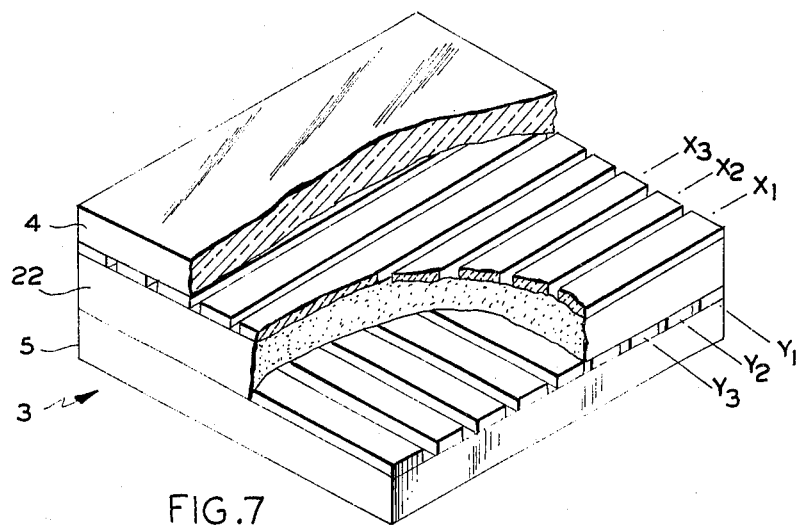
FIG. 7 is a schematic perspective view, partially broken away, of an image display panel according to this invention.

Referring to FIG. 7, wherein similar reference numbers designate components similar to those of the foregoing figures, a suspension layer 22 can be any possible electrophoretic suspension layer, such as the suspension layer 2, 14, 18 or 21 of FIGS. 1a, 2a, 3a or 4a.

The suspension layer 22 includes at least one electrophoretic material suspended in a suspending medium and is enclosed in a housing 3 having two spaced opposed major housing walls 4 and 5, at least one of which is transparent; in the drawing the housing wall 4 is transparent.

A first transparent electrode consists of a plurality of strip electrodes $x_1, x_2, x_3, \ldots$ which are parallel to each other and which are attached to the inner surface of said transparent housing wall 4. A second electrode is attached to the inner surface of said housing wall 5 and consists of a plurality of strip electrodes $y_1, y_2, y_3 \ldots$ which are parallel to each other and are orthogonal to said strip electrodes $x_1, x_2, x_3 \ldots$ A D.C. electric field is applied across one electrode selected from among strip electrodes $x_1, x_2, x_3 \ldots$ and one electrode selected from among strip electrodes $y_1, y_2, y_3, \ldots$ for example, across strip electrodes $x_2$ and $y_3$. The portion of the suspension layer 22 at the intersection of the two strip electrodes $x_2$ and $y_3$ is actually subjected to a D.C. electric field and forms one picture element.

Thinner strip electrodes can be used to form smaller picture elements. A selection of more than one strip electrode from among the strip electrodes forming the first and second electrodes produces a desired pattern consisting of a plurality of picture elements. Scanning techniques known to the electrical display art can be utilized to scan the picture elements sequentially and cyclically.

The above described electrodes having parts arranged in a given pattern or being formed of a plurality of segmental or strip electrodes, as shown in FIGS. 5, 6 and 7, can be easily prepared by using any available and suitable method such as electrodeposition, vacuum evaporation, printing or photoetching techniques.

Figure 8A:
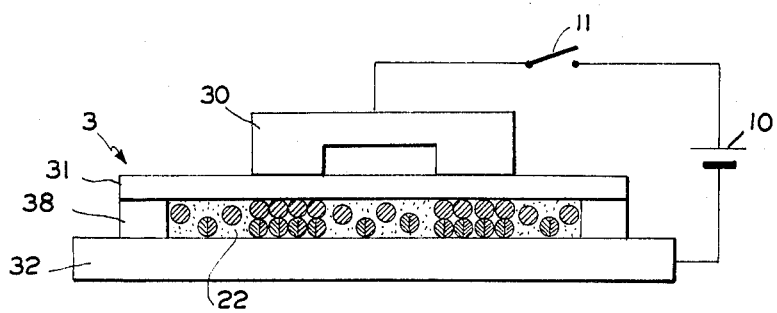
FIGS. 8a, 8b and 8c are schematic cross sectional views of an electrostatic image display and/or recording panel according to this invention.

Referring to FIG. 8, wherein similar reference numbers designate components similar to those of the foregoing figures, a suspension layer 22 can be any possible electrophoretic suspension layer, such as the suspension layer 2, 14, 18 or 21 of FIGS. 1a, 2a, 3a or 4a. The suspension layer 22 includes at least one electrophoretic material suspended in a suspending medium and is enclosed in a housing 3 having two spaced opposed major housing walls 31 and 32, at least one of which is transparent; in the figure, housing wall 31 is transparent and consists of a sheet of an insulating material such as polyester, cellulose acetate, cellophane or polyethylene.

A first electrode 30 is not adhered to the housing wall 31, but is placed on the outer surface of the housing wall 31 so that it can be easily removed and yet it is coupled to the suspension layer 22. The second electrode is made of, for example, a metal plate and is constituted by the other housing wall 32 as shown in FIG. 8.

When the said other housing wall has a high electrical resistance it is possible to attach, as a second electrode, a thin electrically conductive film to the inner surface of the other housing wall 32 or it is also possible to use, as a second electrode, a metal plate on which said other housing wall 32 is placed. When the housing wall 31 has a high electrical resistance, a higher D. C. voltage must be applied across said first electrode and second electrode.

When said first electrode 30 has a given pattern, a D.C. electric field applied across the first electrode 30 and second electrode 32 produces that pattern on the surface of the housing wall 31 due to the electrophoretic movement of the electrophoretic material, even after removal of said first electrode 30.

When said first electrode 30 is a pen type electrode and moves freely on the surface of the housing wall 31, one can display any desired pattern on the surface of the housing wall 31, for example writing, by applying a D.C. voltage across said pen type electrode 30 and second electrode 32, while moving said pen type electrode 30 in the said desired pattern.

An electric field can be applied across the suspension layer 22 by charging the surface of the housing wall 31 having a high electrical resistance with charged particles such as ions or electrons in a manner similar to that well known in the electrostatic recording art.

In order to erase the patterns produced on the display sheet by any such means as described above, a conductive roller with an applied electric voltage is caused to roll on the top surface of the insulating sheet 31 or charged particles having a polarity to cause erasure are placed on the surface of said insulating housing wall 31, so as to apply an electric field with reversed polarity across the suspension layer 22.

Figure 8B:
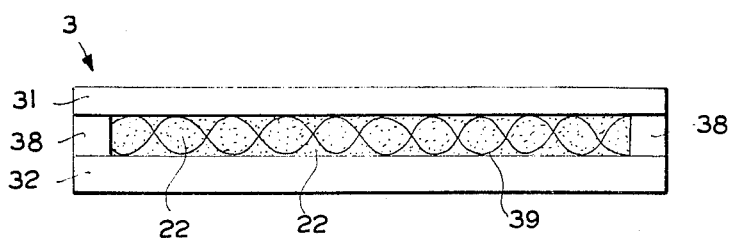
Figure 8C:
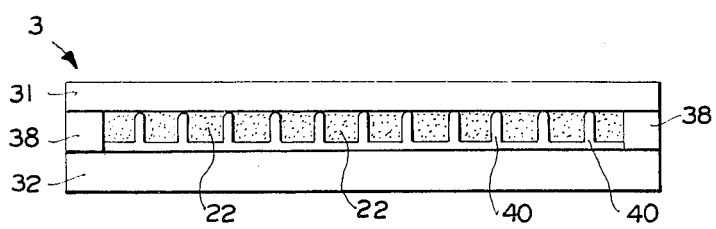

It is preferable to insert between said two major housing walls 31 and 32 a colorless spacer such as a porous layer 39, as shown in FIG. 8b, or a sheet 40 having a lot of projections thereon, as shown in FIG. 8c, particularly when the walls are flexible. Said colorless spacer can keep the suspension layer 22 at a given thickness by preventing the two major housing walls 31 and 32 from touching each other, even when an electrode is pressed against the flexible housing wall 31, or the flexible housing 3 includes an electrophoretic suspension layer in a liquid state and is bent.

Said colorless spacer can be made from any colorless sheet having pores or projections. One appropriate material is a screen of a material such as Tetron or nylon. The Tetron is a trade name of polyester fiber in Japan. Colored porous layer 12 in FIGS. 2a must be substantially opaque and hide the electroporetic material, but said colorless spacer 39 or 40 need not hide the electrophoretic material and can act as a spacer between two major housing walls.

Said colorless spacer is inserted between two major housing walls, or at least one of the major surfaces of the colorless spacer is attached to the inner surface of the housing wall.

Said colorless spacer need not be inserted in a suspension layer including a colored porous layer, if the colored porous layer itself can act as a spacer between two major housing walls.

Figure 9:
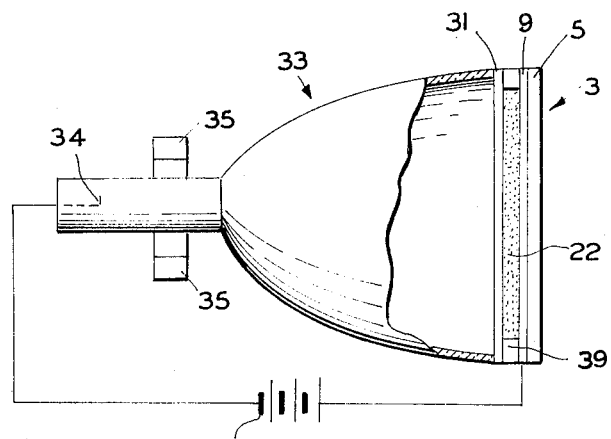
FIG. 9 is a cross sectional view of an image display device according to this invention.

Referring to FIG. 9 wherein similar reference numbers designate components similar to those of the foregoing figures, a housing 3 includes an insulating housing wall 31 and a transparent housing wall 5 having a transparent first electrode 9 attached thereto and connected to a source of electric power 10. The electrophoretic suspension layer 22 is enclosed in the housing 3. Said housing 3 is designed to form the front face of a chamber 33 of a cathode ray vacuum tube.

Negative electron charges in a given pattern are deposited on the insulating housing wall 31 by a video modulated electron gun 34 controlled by a deflecting apparatus 35 so that an electric field is applied across the electrophoretic suspension layer 22. A visible pattern can be reproduced on the transparent housing wall 5 due to the electrophoretic movement of the electrophoretic material. The first electrode 9 acts as an anode. The second electrode is the electron gun 34 which acts as a cathode. The visible pattern can be erased by the secondary emission characteristics of the housing wall 31.

The display device shown in FIG. 9 can be modified. The insulating housing wall 31 can be replaced by a well-known wire-mosaic faceplate consisting of a thin glass sheet having hundreds of fine transversely extending wires embedded therein. This wire-mosaic provides the electrical connection between the electron beam in the vacuum and the electrophoretic suspension layer which is outside the vacuum. The electron beam charges said wire-mosaic so as to apply an input electric field across the suspension layer 22.

Figure 10:
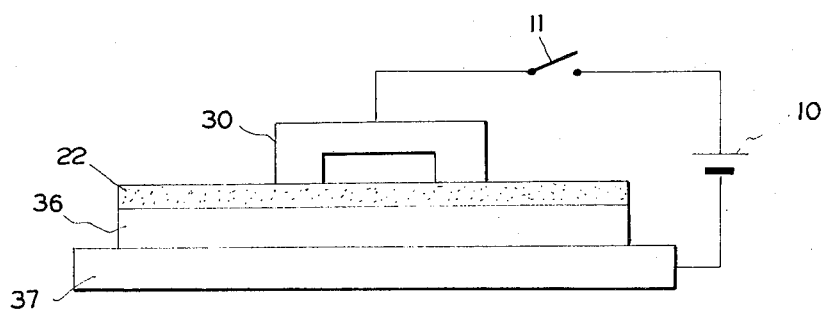
FIG. 10 is a schematic cross-sectional view of an electrostatic image display and/or recording panel according to this invention.

Referring to FIG. 10, wherein similar reference numbers designate components similar to those in the foregoing figures, a suspension layer 22 can be any possible electrophoretic suspension layer, such as the suspension layer 2, 14, 18 or 21 of FIGS. 1a, 2a, 3a or 4a. The suspension layer 22 includes at least one electrophoretic material suspended in a suspending medium and is applied to a base plate 36, such as paper, a metal plate or a plastic sheet. The base plate 36 is place on a second electrode 37. Since the suspension layer 22 is not enclosed in a housing, it must have high viscosity, for example it must be in a solid state at room temperature and yet it must be such that it can be softened during application of a D.C. voltage by any suitable method, such as heating or the addition of a solvent.

A first electrode 30 having a given pattern is in direct contact with the surface of the suspension layer 22. An electric field is applied across the first electrode 30 and the second electrode 37, so as to move the electrophoretic material electrophoretically while the suspension layer 22 is softened by heating or addition of a solvent. Removal of said first electrode 30 leaves the given pattern on the of the suspension layer 22. When the base plate 36 is transparent, one can absorb, through the transparent base plate 36, another given pattern having different color. A visible given pattern can be reproduced permanently on the suspension layer 22 by cooling the suspension layer or by evaporating the solvent. When the base plate 36 is conductive, it also acts as said second electrode 37.

The aforesaid electrophoretic suspension layer can be prepared by using any well known stable colloidal particles suspended in a suspending medium, such as colloidal graphit suspended in mineral oil, or colloidal silver particles suspended in water. In addition to colloidal particles, one can use, as an electrophoretic material, finely divided particles such as titanium dioxide, zinc oxide, carbon black, phthalocyanine blue, phthalocyanine green, hansa yellow or watchung red suspended stably in a suspending medium such as kerosene, trichlolotrifluoroethane, isopropyl alcohol or olive oil. An electrophoretic material suspended in a suspending medium usually has a positive or negative charge, depending upon the properties of the electrophoretic material and the suspending medium.

The electrophoretic suspension layer 2 or 14 of FIG. 1a or FIG. 2a can consist of only one electrophoretic material having a positive or negative polarity suspended in a suspending medium. The electrophoretic suspension layer 18 or 21 of FIGS. 3a or 4a must include at least two kinds of electrophoretic materials suspended in a suspending medium. Those two kinds of electrophoretic materials must have different optical reflective properties and different charge polarities or electrophoretic mobilities. Therefore, in preparing an electrophoretic suspension layer 18 or 21, at least one pair of electrophoretic materials having suitable optical reflective properties and electrophoretic properties must be selectively suspended in a suspending medium.

Average particle sizes of the finely divided particles which will be operable are dependent upon the stability and the hiding power of the resultant electrophoretic suspension, and usually range from $0.1\mu$ to $50\mu$.

It is preferred to add any suitable and available charge control agent, dispersion agent or stabilizing agent to the electrophoretic suspension layer to provide a stable suspension layer in accordance with the prior art well known in solloidal chemistry. In order to control the charge property of the particles suspended in a suspending medium, it is preferred to use particles coated with resin which is not soluble in, or only partially soluble in, the suspending medium. When the coating resin is partially soluble in the suspending medium, it can also act as a fixing agent for a display image.

It is possible to use, as a suspending medium, any available and suitable liquid which is inert to the electrophoretic material, the housing and the electrodes. For producing a temporary display, one can use a suspending medium in a liquid state at room temperature, i.e. from 0° to 35° C. For producing a permanent display, that is, a hard copy, one can use a suspending medium which is in a solid state at room temperature and in a liquid state above room temperature, i.e. above 35° C. Suspending media which are operable for this purpose are, for example, waxes such as beeswax, vegetable wax, paraffin or synthetic wax.

When using such waxes, the device according to the present invention must be kept at a temperature higher than room temperature for producing the display or recording. After the device is subjected to a D.C. electric filed at the higher temperature to vary electrophoretically the spatial distribution of said electrophoretic material, it is cooled to room temperature to produce a permanent display. If it is desired to erase the permanent display, the device is subjected to an A.C. or D.C. electric field at the higher temperature.

When the suspending medium consists of a thermosetting material which is in a liquid state at room temperature, one can produce a permanent display by heating the suspending medium after the electrophoretic movement of the electrophoretic material.

Thermosetting materials which are operable as suspending media are, for example, drying oil such as linseed oil, soya oil or tung oil. When the liquid suspending medium includes a binder such as polystyrol, vinyl acetate resin or linseed oil which fixes the electrophoretic material in a finely divided powder form, one can obtain a hard copy having a permanently visible image reproduced thereon by evaporating or exhausting the residual suspending medium. The evaporation or exhausting of the suspending medium can be achieved by, for example, evacuating the housing including electrophoretic material in the suspending medium through an outlet formed, for example, in the housing wall.

A housing for use in the device according to the present invention can be prepared by using any available material which is inert to the suspending medium and the electrophoretic material. For example, a plastic sheet having a major center part cut out can be used for a frame 38 of the housing 3 as shown in FIG. 1a. One of the two opposite major housing walls can be provided by adhering, for example, a metal plate to the frame. The metal plate acts as one electrode of the aforesaid two electrodes. The other of the two opposite major housing walls can be provided by adhering, for example, a transparent glass plate having a transparent conductive thin film such as tin oxide or cuprous iodine to the frame in such a way that the transparent conductive thin film is brought into contact with the electrophoretic suspension layer.

An electrophoretic material suspended in a suspending medium can be poured into a housing having only one major housing wall. After that, the other major housing wall can be attached to the frame.

Another method is to pour the electrophoretic material suspended in a suspending medium into the housing through an inlet formed, for example, in the housing wall. The inlet is closed after the housing is filled with the electrophoretic material suspended in the suspending medium.

One can use any appropriate apparatus for applying an electric field across the suspension layer through the two electrodes. For example, a pulse generator, a battery or any other D.C. source can be used. In order to erase the displayed image, an A.C. source can also be used.

It has been discovered according to this invention that when at least one of the aforesaid first electrode and second electrode is coated with an insulating layer which is in contact with the aforesaid suspension layer, the device according to the present invention has an improved operating life. The insulating layer prevents the breakdown of the insulating property of the suspension layer even when a high electric voltage is applied thereto and makes it easy to remove the electrophoretic material from the electrode surface in order to form a new image by subjecting the device to a D.C. electric field of reversed polarity or to an A.C. field.

Figure 11:
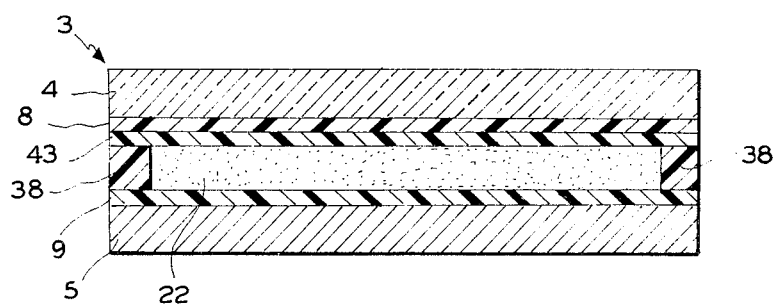
FIG. 11 is a cross sectional view of a display panel according to this invention.

Referring to FIG. 11, wherein similar reference numbers designate components similar to those of the foregoing figures, a first electrode 8 is coated with an insulating layer 43 which is not soluble in the suspending medium. Instead of the first electrode 8, a second electrode 9 or both the first and second electrodes 8 and 9 can be coated with insulating layers. The insulating layer 43 is prepared by coating the first electrode with, for example, vinyl acetate resin, polystyrol or gelatin. A transparent insulating layer is thus applied to a transparent electrode attached to a transparent housing wall.

The thickness of said insulating layer 43 depends on the electrical resistance which said insulating layer and the electrophoretic suspension layer 22 are required to have. It is preferable for operation at a low voltage that the insulating layer 43 have an electrical resistance no higher than that of the suspension layer 22.

Figure 12A:
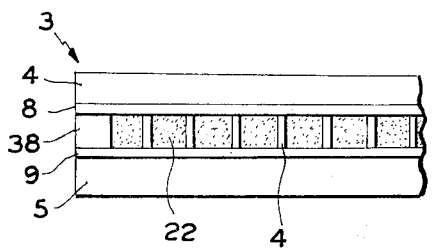
FIGS. 12a and 12b are cross sectional views of a display panel according to this invention.

Referring to FIG. 12a, wherein similar reference numbers designate components similar to those of the foregoing figures, the suspension layer 22 has a plurality of spacers extending traversely thereof and consists of many small spaces filled with the suspension. A sheet 41 with a lot of holes 42 therein, as shown in FIG. 13, can be used so as to divide the suspension layer 22 into separate suspension units.

Figure 13:
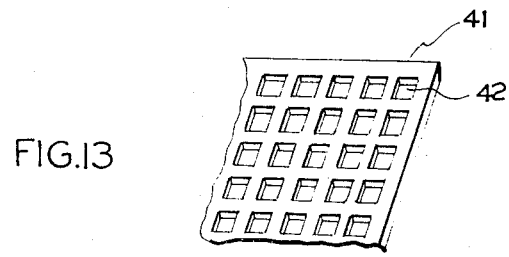
FIG. 13 is a schematic perspective view of a sheet with holes for use in the panel of FIG. 12.

Holes 42 can have any suitable shape, such as square, as shown in FIG. 13, circular, rectangular, hexagonal, and so on. Holes 42 can be regular or irregular in shape, dimension and order. The dimensions of the holes 42 should be selected according to the purpose of the display or the nature of the suspension, but they must be at least greater than the dimensions of electrophoretic material in the suspension.

Figure 12B:
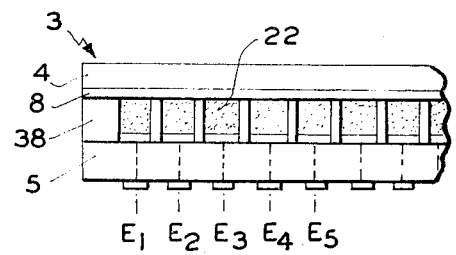

The advantages of dividing the suspension layer into a plurality of suspension units are as follows: a uniform display can be produced because flow of the suspension is restricted to the interior of each space. Said plurality of suspension units can have different optical reflective properties from each other. It is possible for said plurality of suspension units to have at least two colors. The plurality of suspension units are preferably inserted between two electrodes, one of which has a plurality of segment electrodes ($E_1$, $E_2$, $E_3$, ... ), for example, in dot form and in contact with the plurality of suspension layer units, respectively, and the other of which is transparent and covers the whole of the transparent housing wall 4, as shown in FIG. 12b. The device as shown in FIG. 12b can produce a color image by applying a D.C. voltage between the electrode 8 and selected segment electrodes.

Figure 12C:
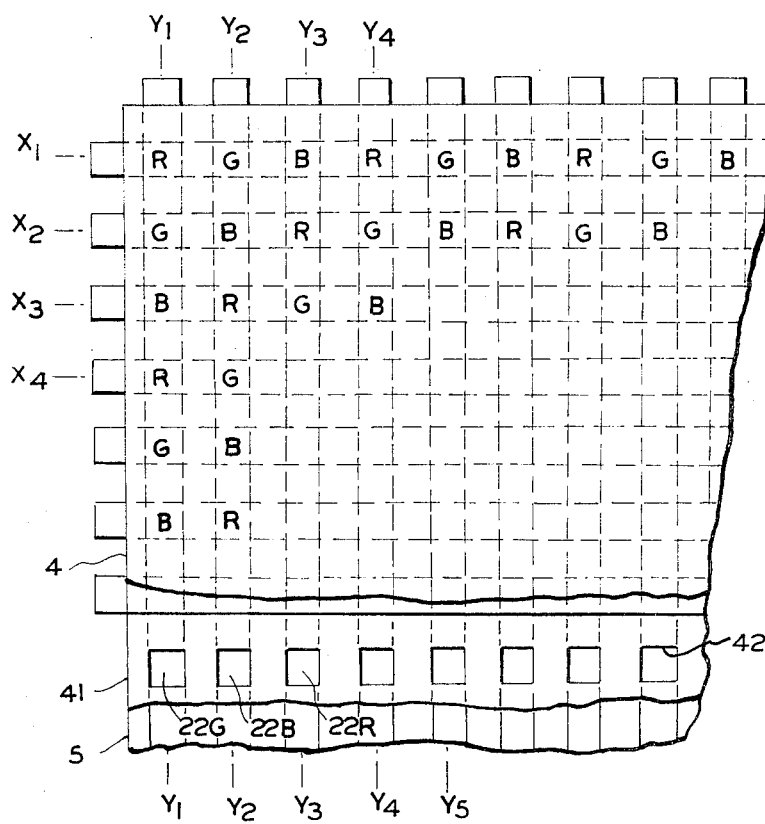
FIG. 12c is a schematic front view of a display panel according to this invention.

The best way to provide electrodes for the plurality of suspension units is to provide a first electrode consisting of a plurality of strip electrodes parallel to each other and a second electrode consisting of a plurality of strip electrodes which are orthogonal to said first electrodes, similar to the arrangement shown in FIG. 7, in such a way that each of intersection points of said first electrodes and said second electrodes is operatively associated with one of the plurality of suspension units. Each of the intersection points forms a picture element in association with a respective suspension unit which is colored red, as at 22R, green as at 22G, or blue, as shown in 22B in FIG. 12c. An application of an electric field to desired picture elements will reproduce a colored image on the image display panel.

A display panel for a color image can be prepared by using only one kind of suspension capable of changing in color in shades of grey between black and white. This is accomplished by making the areas of the transparent housing wall corresponding to each picture element in a display panel, as shown in FIG. 7, selectively colored so that it acts as a color filter for red, green or blue. However, a display panel having at least three kinds of suspensions, i.e. red, green and blue, and produce a better color image, especially with respect to lightness of the high lights, than can a panel with mosaic color filters on the transparent housing wall.

In a character display panel, as described in FIG. 6, the suspension corresponding to one of the segmental electrodes can consist of one or more suspension units.

The amount of electrophoretic material in a suspending medium or the thickness of the electrophoretic suspension layer is selected, depending upon the hiding power or electrophoretic property of the electrophoretic material, the range of color change required in the device, the feasibility of the voltage source and so on. The value of the hiding power of pigment particles available commercially is helpful in preparing the suspension. For example, the values of the hiding powers of titanium dioxide particles and acetylene black particles are about 130 $cm^2$ and 25,400 $cm^2$, respectively, per gm in the conventional suspending liquids such as linseed oil. Therefore, at least 1 gm of titanium dioxide particles and at least 5 mg acetylene black particles are required, respectively, so as to change the color of the display panel having an area of 130 $cm^2$ from sufficient black to sufficient white. When the thickness of suspension layer is to be 1 mm, said amount of each pigment particles must be introduced into 13 ml of the suspending medium.

Since the display device of the present invention is the reflective type, the suspension layer must be opaque in order to make a great color change. The thicker the suspension layer, the higher the applied voltage which is usually required. The thinner the suspension layer, the denser the concentration of the electrophoretic material must be to make a great color change. The thickness of the suspension layer is usually from a few microns to a few mm.

EXAMPLE 1

A mixture of particles as described in Table 1 is combined with 100 ml of iso-propyl alcohol. The mixture in the iso-propyl alcohol is well blended to produce a grey paste having white and black particles suspended in iso-propyl alcohol. In this grey paste, the titanium dioxide particles are positively charged and the black toner particles are negatively charged. A housing as shown in FIG. 1 is filled with the grey paste so as to form an electrophoretic suspension layer. The housing has two opposite major housing walls with a size of 60 × 60 mm. The two major housing walls are made of transparent electrodes, each of which is a thin film of tin oxide applied to a transparent glass plate. This electrically conductive glass is called EC glass in the following examples. A side frame is prepared from $25\mu$ thick polyester film in a manner similar to that described above. The thickness of the electrophoretic suspension layer is designed to be $25\mu$. This electrophoretic suspension layer is almost opaque and grey when viewed through either of said transparent electrodes under the light of an incandescent lamp.

TABLE 1

Titanium dioxide:
  10g (a brand R-680 commercially available from the Ishihara Industrial Company in Japan, of rutile type having a particle size $0.15 - 0.3\mu$.
black toner particles:
  20g (Type-10 manufactured for electrophotography by the Rank Xerox Company in England).

When a D.C. voltage of 25V is applied between the two electrodes, the suspension layer is changed in color; it is black at the anode and white at the cathode. The black color at the anode or the white color at the cathode remains stable even after the D.C. voltage is cut off.

The color on one side can be changed from black or white to white or black by reversing the polarities of the applied voltage. An application of an A.C. voltage of 25V at 60 Hz between the two electrodes changes the color from the white at the cathode or the black at the anode to grey at both electrodes, and it remains in this original condition.

When the applied A.C. voltage has a frequency below about 20Hz, the lightness of the suspension layer is altered periodically from the white through grey to black and vice versa in accordance with the frequency of the applied voltage. An application of D.C. voltage below 25V changes the color gradually and continuously from grey to white at the cathode or black at the anode. A desired grey color between the white and the black will remain in a stable condition after switching off the voltage at the moment when the desired color appears on the panel.

A rapid change in the lightness of the suspension layer can be obtained by applying a D.C. voltage above 25V with a definite pulse width. The color of the panel is simply and easily changed and the panel is useful for conveying information.

EXAMPLE 2

Fifteen grams of finely divided titanium dioxide particles (same as in Table 1) and fifteen grams of black toner particles (same as in Table 1) are added to 200 ml of olive oil.

The mixture is well blended in a ball mill to produce a grey paste. In this grey paste, the titanium dioxide particles are positively charged and the black toner particles are negatively charged. A housing similar to that of Example 1 is filled with the grey paste so as to produce a cell having an electrophoretic suspension layer as shown in FIG. 3. The thickness of the electrophoretic suspension layer is $100\mu$.

The side faces of said cell are made liquid-tight by an adhesive agent, for example, Araldite, an adhesive commercially available from CIBA Limited in Switzerland, while each electrode is partially exposed to allow for connection of leads.

The application of a D.C. voltage of 250V between the electrodes for about 1-second changes the color of the suspension layer at each electrode; one observes a change in color from grey to white at the cathode and to black at the anode. A current meter with a recording apparatus connected between the voltage source and the cell indicates that the average current flowing during electrophoresis of particles is about $4 \times 10^{-9}$ amperes per $cm^2$ of the cell. This means that the display apparatus of the present invention has a rather high electrical efficiency. By the application of a D.C. voltage below 250V, the lightness of the suspension layer can be altered slowly and it remains stable at the desired lightness level.

EXAMPLE 3

Ten grams of Heliogen blue LBGT particles, which are phthalocyanine blue supplied by the BASF Company in Germany, is added to 100 ml of olive oil and blended well in a ball mill so as to produce a blue paste. Fifteen grams of hansa yellow G particles, which are an azo type organic pigment supplied by the Kanto Chemcial Company in Japan, is added to 100 ml of olive oil and blended well in a ball mill so as to produce a yellow paste. Equal amounts of the two pastes are mixed well to produce a green paste.

The green paste is placed between an aluminum plate and an EC glass electrode so as to produce an electrophoretic suspension layer with a thickness of $25\mu$. When a D.C. voltage of 100V is applied between the EC glass electrode as an anode and the aluminum plate, the color of the suspension layer as viewed through the glass electrode changes from green to yellow under a white light. The color of the suspension layer is changed to blue by reversing the polarity of the applied voltage.

Control of strength, the length of time of application or the polarity of the applied voltage makes it possible to change the color of said suspension layer continuously from the color of the yellow particles through that of a mixture of yellow particles and the blue particles to that of the blue particles and vice versa. This is because the suspension layer adjacent to the E.C. glass electrode includes a mixture of blue and yellow particles in various ratios.

Said cell is thus useful as a color changeable panel capable of altering the color of the suspension layer continuously throughout the color range of the colors blue, green, and yellow.

EXAMPLE 4

Four grams of hansa yellow G particles (same as in Example 3) is added to 50 ml of olive oil and blended well in a ball mill to produce a yellow paste.

Eight grams of ultramarine particles supplied by the Daiichi Kasei Industrial Company in Japan is added to 50 ml of olive oil and blended well in a ball mill to produce a blue paste.

Equal amounts of the pastes are mixed well to produce a green paste. A housing which employs, as two opposite major housing walls, two flexible transparent electrodes made from a sheet of cellulose diacetate (CDA) and having a transparent conductive layer of cuprous iodine (CuI) applied to each wall is filled with said green paste. A sheet of Tetron screen (01350 a screen woven of polyester fibers supplied by the Teijin Company in Japan) is inserted between said two flexible transparent electrodes in the manner shown in FIG. 8b.

When a D.C. voltage of 200V is applied between the two flexible transparent electrodes, the anode becomes yellow and the cathode becomes dark blue-green. A reversal of the polarity of the applied voltage causes the colors of the two electrodes to change from the yellow to the blue-green and from the glue-green to the yellow, respectively.

Hansa yellow G particles are negatively charged, but ultramarine particles do not have any great electrophoresis activity in olive oil. In this suspension layer, the yellow particles capable of moving electrophoretically are suspended in blue-colored suspending medium consisting of olive oil colored by ultramarine particles.

Said cell is useful as a flexible sheet capable of changing color throughout a color range from yellow through green and blue-green, depending on the change in strength, length of time of application, and polarity of the applied voltage.

EXAMPLE 5

A mixture of particles described in Table 2 is combined with 50 ml of iso-propyl alcohol. This mixture is iso-propyl alcohol is well mixed by an ultrasonic vibrator to produce a yellow-green suspension.

TABLE 2

Cadmium sulfide particles:
  10g (commercially available from the Sakai Chemical Industry Company in Japan)
Patent blue A particles:
  2g (commercially available from the Kanto Chemical Industry Company in Japan).

A housing is filled with the suspension so as to form an electrophoretic suspension layer, as shown in FIG. 1. Two major housing walls of the housing are made of EC glass electrodes. The side frame is made of a polyester film. The thickness of the electrophoretic suspension layer is 25μ.

When a D.C. voltage of 15V is applied between the electrodes, the suspension layer is changed in color. It is yellow at the cathode and green at the anode. The color on the respective sides can be changed from yellow or green to green or yellow by reversing the polarity of the applied voltage.

EXAMPLE 6

Thirty-five grams of a cobalt naphthenate, metal content 8 weight percent (supplied by the Kanto Chemical Company in Japan), is dissolved in 100 ml of trichlorotrifluoroethane to produce a red-brownish solution. Twenty grams of titanium dioxide particles (same as in Table 1) is added to the solution and blended well to produce a faint pink paste. In this paste, the titanium dioxide particles are positively charged. A housing is filled with the paste so as to form an electrophoretic suspension layer.

Two major housing walls of the housing are made of an EC glass electrode. The thickness of the suspension layer is 50μ. When a D.C. voltage of 50V is applied between the two electrodes, the suspension layer is changed in color. It is white at the cathode and brown at the anode.

Control of the strength, the length of time application and polarity of the applied voltage changes the lightness of brown color at one side of the panel continuously. The established color remains stable even after removal of the applied voltage.

In the suspension as described above, the cobalt naphthenate functions as the coloring agent for the transparent suspending medium consisting of trichlorotrifluoroethane, the charge control agent for advancing the positive charge of the titanium dioxide particles, and the dispersing agent for stabilizing the suspension.

EXAMPLE 7

Ten grams of titanium dioxide particles (same as in Table 1) is added to 100 ml of olive oil and blended well in a ball mill so as to produce a white paste.

A housing is provided which is similar in construction to that of FIG. 2a. The two opposite major housing walls are formed of an aluminum plate and an EC glass electrode which act as first electrodes and second electrodes, respectively. The EC glass electrode has an insulating layer of vinylacetate resin having a thickness of about 7μ applied to the $SnO_2$ coating. A thick dark blue cloth is inserted as a colored porous layer between said first and second electrode. Said thick dark blue cloth has a thickness of about 100μ. One thick dark blue cloth which can be used is "Bemberg" which is the trade name of cloth manufactured at the Asahi Kasei in Japan. A sheet of Tetron screen No. 1000 (supplied by the Teijin Company in Japan) is placed between the aluminum plate and thick dark blue cloth.

A sheet of another Tetron Screen No. 1350 (supplied by the Teijin Company) is placed between the insulating layer on the EC glass electrode and the thick dark blue cloth. The housing is filled with the above described white paste. The thick dark blue cloth and Tetron screens have the white paste impregnated therein. The panel has a faint blue color at the EC glass electrode before application of a D.C. voltage.

When a D.C. voltage of 400V is applied between the EC glass electrode as a cathode and the aluminum plate as an anode, the panel has a white color at the EC glass electrode. This is because white titanium dioxide particles in the paste move electrophoretically to the EC glass electrode and hide the thick dark blue cloth from sight at the EC glass electrode.

The color of the panel at the EC glass electrode changes from white to blue upon reversal of the polarity of the applied voltage.

EXAMPLE 8

An $SnO_2$ layer on an EC glass electrode is coated with a photoresist solution, for example KPR, available commercially from the Kodak Company in U.S.A., and is etched by a well known photoetching technique so as to form segmental electrodes as shown in FIG. 6c. For convenience, the EC glass electrode having these segmental electrodes formed thereon is hereinafter called a transparent electrode. A housing is prepared by using this transparent electrode as one electrode and an aluminum plate as another electrode in a way similar to that described in the foregoing description. The inner surface of the aluminum electrode is coated with an insulating layer of vinyl acetate resin having a thickness of about 8μ.

The housing is filled with a grey paste exactly the same as that of Example 2. The grey paste forms a suspension layer having a thickness of 25μ. The segmental electrodes are connected, through switches, to one terminal of a D.C. voltage source. The EC glass electrode has a grey color before a D.C. voltage is applied.

The other terminal of the D.C. voltage source is connected to the aluminum electrode. An application of a D.C. voltage of 200V between the aluminum electrode and selected segmental electrodes produces a desired numerical character on the EC glass electrode.

For example, selection of segmental electrodes $S_1$, $S_2$ $S_3$, $S_4$, $S_5$, $S_7$ (references as in FIG. 6) produces "0," the selection of segmental electrodes $S_1$–$S_7$ produces "8;" the selection of segmental electrodes $S_1$ and $S_2$ produces "1." When the segmental electrodes are charged positively, the numerical character which is produced is black; the opposite charge produces a white numerical character.

What is claimed is:

1. A device for display and/or recording, comprising an electrophoretic suspension layer, said suspension layer being selected from the group consisting of a suspension including at least one electrophoretic material suspended in a colored suspending medium, a suspension including at least one electrophoretic material suspended in a suspending medium having further a porous layer therein, a suspension including at least two electrophoretic materials suspended in a suspending medium, one of said at least two electrophoretic materials differing in charge polarity and optical reflective property from the other, and a suspension including at least two electrophoretic materials suspended in a suspending medium, one of said at least two electrophoretic materials differing in electrophoretic mobility and optical reflective property from the other, said suspension layer having two opposite major surfaces; a first electrode and a second electrode which are spaced from and opposed to each other and are positioned on said two opposite major surfaces of said suspension layer, respectively; and means coupled to said electrodes for applying an electric field across said suspension layer through said electrodes, said electric field changing the spatial distribution of said electrophoretic material, the optical reflective property of said suspension layer being changeable in response to said change in spatial distribution.

2. A device as claimed in claim 1 wherein said suspension layer includes at least two electrophoretic materials, one of which differs in the charge polarity and optical reflective property from the other.

3. A device as claimed in claim 1 wherein said suspension layer includes at least two electrophoretic materials, one of which differs in electrophoretic mobility and the optical reflective property from the other.

4. A device as claimed in claim 1, wherein said suspending medium is colored.

5. A device as claimed in claim 1 further comprising a porous layer inserted in said suspending medium.

6. A device as claimed in claim 1 wherein at least one of said first electrode and second electrode is in the shape of a given pattern.

7. A device as claimed in claim 1 wherein said suspension further contains a binder for said electrophoretic material, which binder is at least partially soluble in said suspending medium.

8. A device as claimed in claim 1, wherein said suspending medium is a hardenable material.

9. A device as claimed in claim 1 wherein said suspending medium is heat hardenable.

10. A device as claimed in claim 1 wherein said suspending medium is heat softenable.

11. A device as claimed in claim 1 wherein said suspending medium is solvent softenable.

12. A device as claimed in claim 1 wherein said means for applying an electric field includes means for controlling said electric field with respect to at least one property selected from the group consisting of strength, length of time of application and polarity.

13. A device as claimed in claim 1 further including a housing enclosing said suspension layer.

14. A device as claimed in claim 13 wherein at least one of said first electrode and second electrode is in the shape of a given pattern.

15. A device as claimed in claim 14 further comprising a conductive lead extending out of said housing.

16. A device as claimed in claim 13, wherein said suspension layer has a plurality of spacers therein extending transversely thereof.

17. A device as claimed in claim 13, wherein at least one of said first electrodes and second electrodes is coated with an insulating layer whis is in contact with said suspension layer.

18. A device as claimed in claim 13 in which said housing has two spaced opposed major housing walls between which said suspension layer and said electrodes are positioned, and at least one of which walls is transparent.

19. A device as claimed in claim 13 wherein at least one of said first electrode and second electrode is transparent and the housing has a transparent housing wall covering said transparent electrode.

20. A device as claimed in claim 19 wherein said first electrode covers the whole of one surface of said suspension layer, and said second electrode covers the whole of the other surface of said suspension layer.

21. A device as claimed in claim 19 wherein at least one of said first electrode and second electrode is in the shape of a given pattern.

22. A device as claimed in claim 19 wherein at least one of said first electrode and second electrode is divided into a plurality of segmental electrodes.

23. A device as claimed in claim 19 wherein said first electrode consists of a plurality of strips of electrode material which are parallel to each other, and said second electrode consists of a plurality of strips of electrode material which are parallel to each other and are orthogonal to said first electrode strips.

24. A device as claimed in claim 13 wherein said housing has two opposite major walls, and one of said electrodes forms one of said two opposite major housing walls.

25. A device for display, comprising an electrophoretic suspension layer having a suspending medium and at least one electrophoretic material in a finely divided powder form suspended in said suspending medium, said suspension layer having two opposite major surfaces, a transparent electrode positioned on one of said major surfaces of said suspension layer, a housing having said suspension layer enclosed therein and having a transparent housing wall over said electrode, and a cathode ray vacuum tube having an electron gun therein and having said housing closing the end of said vacuum tube opposite from said electron gun with the transparent housing wall on the outside of the vacuum tube and with said other major surface of the suspension layer facing toward said electron gun.

* * * * *

PO-1050
(5/69)

UNITED STATES PATENT OFFICE
CERTIFICATE OF CORRECTION

Patent No. 3,668,106           Dated June 6, 1972

Inventor(s)  ISAO OTA

It is certified that error appears in the above-identified patent and that said Letters Patent are hereby corrected as shown below:

In the printed heading of the patent after line 5 insert:

--FOREIGN APPLICATION   PRIORITY DATA

| April 23, 1969 | Japan........ | 44/31598 |
| April 23, 1969 | Japan........ | 44/31602 |
| July 29, 1969  | Japan........ | 44/60154 |
| June 12, 1969  | Japan........ | 44/46698 |
| June 12, 1969  | Japan........ | 44/46699 |
| June 12, 1969  | Japan........ | 44/46700 |
| June 12, 1969  | Japan........ | 44/46701 --. |

Column 5, lines 64-67 to be deleted.

Signed and sealed this 10th day of April 1973.

(SEAL)
Attest:

EDWARD M. FLETCHER, JR.                    ROBERT GOTTSCHALK
Attesting Officer                          Commissioner of Patents